(12) United States Patent
Popple

(10) Patent No.: US 9,773,411 B2
(45) Date of Patent: Sep. 26, 2017

(54) VEHICLE-TO-VEHICLE AND TRAFFIC SIGNAL-TO-VEHICLE COMMUNICATION SYSTEM

(71) Applicant: Steven Cameron Popple, Victoria (CA)

(72) Inventor: Steven Cameron Popple, Victoria (CA)

(*) Notice: Subject to any disclaimer, the term of this patent is extended or adjusted under 35 U.S.C. 154(b) by 0 days.

(21) Appl. No.: 14/929,304

(22) Filed: Oct. 31, 2015

(65) Prior Publication Data
US 2017/0124864 A1 May 4, 2017

(51) Int. Cl.
*G08B 21/00* (2006.01)
*G08G 1/07* (2006.01)
*H04W 76/02* (2009.01)
*G06K 7/14* (2006.01)
*G06K 7/10* (2006.01)
*G06K 9/32* (2006.01)

(52) U.S. Cl.
CPC .......... *G08G 1/07* (2013.01); *G06K 7/10722* (2013.01); *G06K 7/1417* (2013.01); *G06K 9/325* (2013.01); *H04W 76/02* (2013.01)

(58) Field of Classification Search
CPC .................................................. G06K 7/10722
USPC ............... 340/907, 901, 902, 903, 904, 905
See application file for complete search history.

(56) References Cited

U.S. PATENT DOCUMENTS

| 6,765,495 | B1 | 7/2004 | Dunning |
| 7,382,274 | B1 | 6/2008 | Kermani |
| 7,877,196 | B2 | 1/2011 | Lin |
| 8,307,037 | B2 | 11/2012 | Bain |
| 8,412,107 | B2 | 4/2013 | Hamada |
| 8,886,386 | B2 | 11/2014 | Merk |
| 2006/0161315 | A1 | 7/2006 | Lewis |
| 2014/0306834 | A1 | 10/2014 | Ricci |

FOREIGN PATENT DOCUMENTS

| EP | 1223567 | 7/2002 |
| WO | WO 2013163265 | 10/2013 |
| WO | WO 2014051473 | 4/2014 |
| WO | WO 2014145345 | 9/2014 |

*Primary Examiner* — Jeffery Hofsass
(74) *Attorney, Agent, or Firm* — Richard D. Okimaw

(57) ABSTRACT

Disclosed herein is a wireless vehicle-to-vehicle and traffic signal-to-vehicle communication system, comprising: a) at least one traffic signal comprising a wireless transceiver capable of transmitting and receiving at least one message to/from at least one vehicle; and b) at least two vehicles, each comprising a vehicle communication unit comprising i. at least one vehicle wireless transceiver capable of transmitting and receiving at least one message to/from a plurality of vehicles and/or traffic signals; ii. a vehicle display unit; and iii. a vehicle-to-vehicle pairing system comprising one or more wireless messages, visual indicators or a combination thereof; wherein the communication system is configured for wireless communication, and wherein information is transmitted and received via the communication system between the at least two vehicles and/or at least one vehicle and at least one traffic signal.

16 Claims, 5 Drawing Sheets

VEHICLE-TO-VEHICLE AND TRAFFIC SIGNAL-TO-VEHICLE COMMUNICATION SYSTEM

FIELD OF THE INVENTION

The present invention is in the field of vehicle-to-vehicle and traffic signal-to-vehicle communication systems and methods of improving traffic flow and safety between vehicles with the communication systems described herein.

BACKGROUND OF THE DISCLOSURE

Automobiles communicate with other vehicles via external signals such as left or right turn signal lights blinking and brake light(s) illuminated. The accurate processing of visual signals is dependent on the awareness of the driver at the time that the signals occur. Visual confirmation of turn signals and brake lights are important to maintain proper separation between vehicles in front, behind, and to the sides of the vehicle. As well, vehicle drivers must constantly take in other visual signals such as road signs, etc. These communication systems are dependent on the visual awareness of each driver. Therefore, it would be beneficial to have improved communication devices that enable traffic to flow more and improve safety between drivers.

SUMMARY OF THE INVENTION

A wireless vehicle-to-vehicle and traffic signal-to-vehicle communication system, comprising: a) at least one traffic signal comprising a wireless transceiver capable of transmitting and receiving at least one message to/from at least one vehicle; and b) at least two vehicles, each comprising a vehicle communication unit comprising i. at least one vehicle wireless transceiver capable of transmitting and receiving at least one message to/from a plurality of vehicles and/or traffic signals; ii. a vehicle display unit; and iii. a vehicle-to-vehicle pairing system comprising one or more wireless messages, visual indicators or a combination thereof; wherein the communication system is configured for wireless communication, and wherein information is transmitted and received via the communication system between the at least two vehicles and/or at least one vehicle and at least one traffic signal.

A method of improving traffic flow and safety between vehicles, comprising a wireless vehicle-to-vehicle and traffic signal-to-vehicle communication system, comprising: a) transmitting at least one message from at least one traffic signal from a wireless transceiver to at least one vehicle; b) receiving at least one message from at least one traffic signal to at least one vehicle comprising a wireless transceiver capable of transmitting and receiving at least one message to/from at least one traffic signal; and/or transmitting and/or receiving at least one message between at least one vehicle comprising a wireless transceiver capable of transmitting and receiving at least one message to/from a plurality of vehicles, wherein information is transmitted and received via a communication system between at least two vehicles and/or at least one vehicle and at least one traffic signal.

DETAILED DESCRIPTION OF THE EMBODIMENTS

The following is a detailed description of certain specific embodiments of the wireless vehicle-to-vehicle and traffic signal-to-vehicle communication system disclosed herein. In this description reference is made to the drawings.

Definitions

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Introduction

In one aspect, disclosed herein is a wireless vehicle-to-vehicle and traffic signal-to-vehicle communication system, comprising: a) at least one traffic signal comprising a transceiver capable of transmitting and receiving at least one message to/from at least one vehicle; and b) at least two vehicles, each comprising a vehicle communication unit comprising i. at least one vehicle wireless transceiver capable of transmitting and receiving at least one message to/from a plurality of vehicles and/or traffic signals; ii. a vehicle display unit; and iii. a vehicle-to-vehicle pairing system comprising one or more wireless messages, visual indicators or a combination thereof; wherein the communication system is configured for wireless communication, wherein information is transmitted and received via the communication system between the at least two vehicles and/or at least one vehicle and at least one traffic signal, and wherein the communication unit further comprises a processor unit configured to store data in the system memory received from the pairing system, at least one message from the at least one vehicle, at least one message from at least one traffic signal or a combination thereof.

Figure 1:
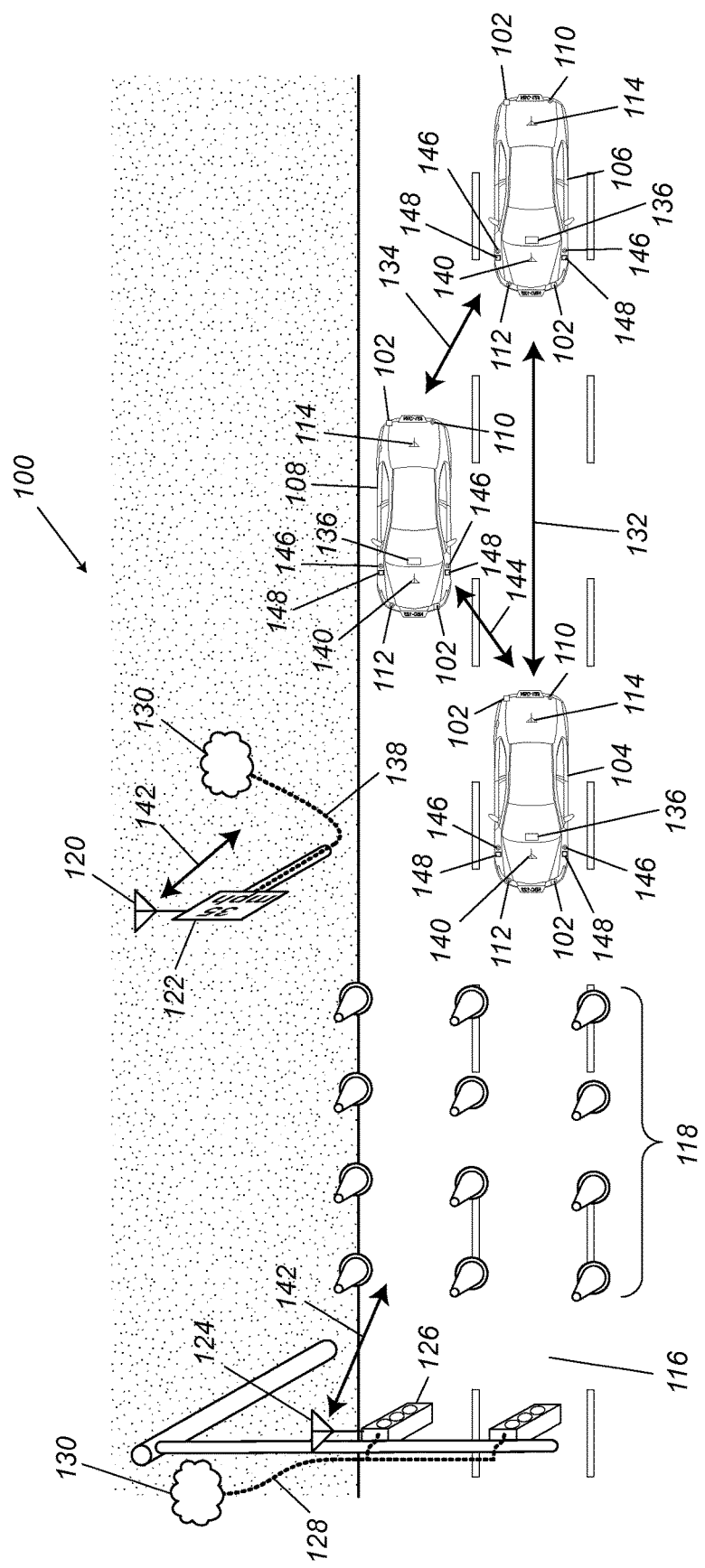
FIG. 1 is a perspective view of a wireless vehicle-to-vehicle and traffic signal-to-vehicle communication system 100, comprising traffic light 126, traffic signal 122, construction zone 118 and vehicles 104, 106 and 108 in communication.
Figure 2:
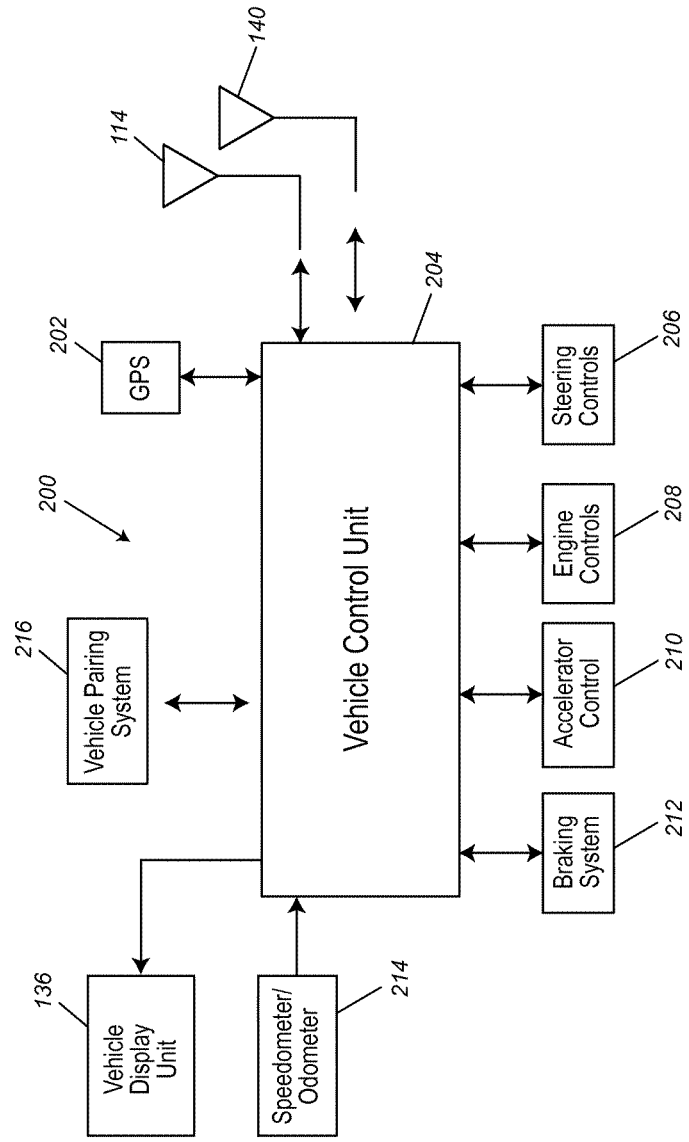
FIG. 2 shows a block diagram of a vehicle communication system 200 comprising vehicle transceivers 114 and 140, pairing system 216, vehicle display unit 136 and further comprising data interfaces with a vehicle control unit 204.
Figure 3:
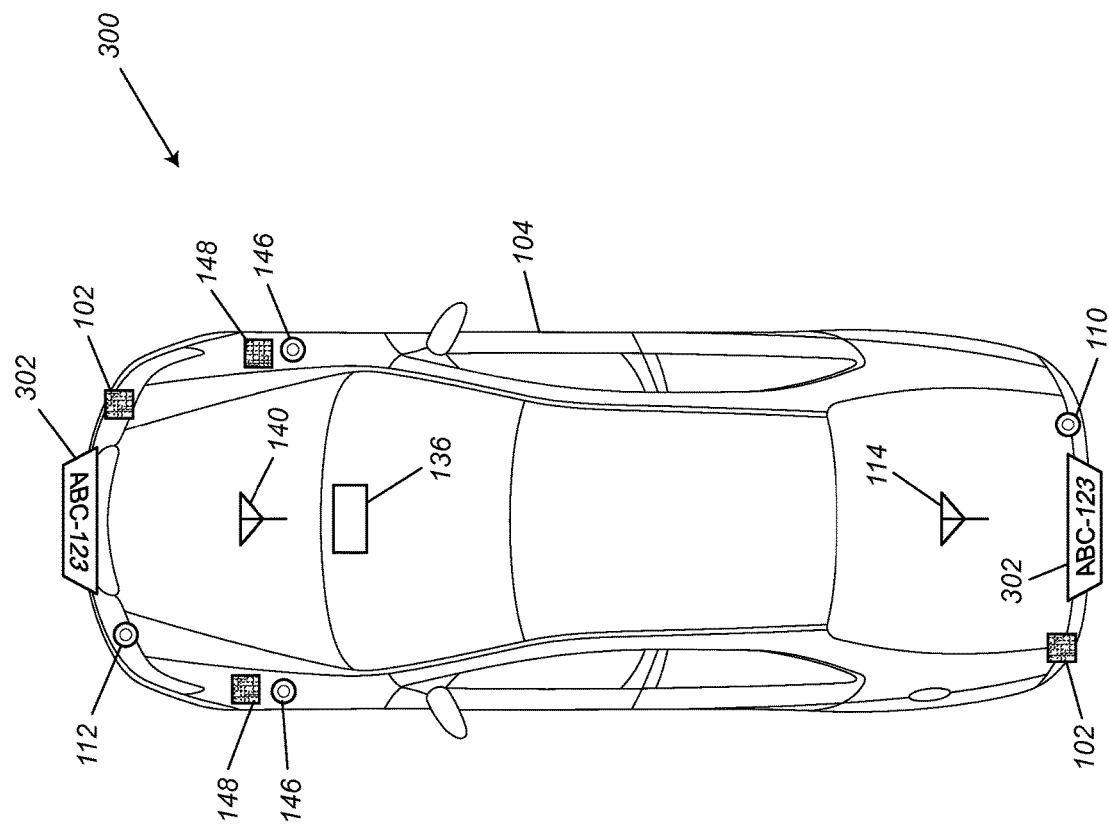
FIG. 3 is a perspective view of a vehicle communication system 300 comprising transceivers 114 and 140, visual indicators 102 and 148, and cameras 110, 112 and 146.

Referring to the drawings, FIGS. 1-3 illustrate a vehicle-to-vehicle and traffic signal-to-vehicle communication system 100 comprising a first vehicle 104 and vehicles 106 and 108. The communication system 100 depicts the vehicles traveling on a road 116 comprising a traffic light 126, and a traffic signal 122 indicating a speed limit in a construction zone 118. The traffic signal depicted in FIG. 1 shows a traffic light 126 comprises a transmitter or wireless transceiver 124, data cable 128 and computer network 130. Traffic signal 122 as depicted in FIG. 1 shows a speed limit sign in a construction zone 118 comprising a transmitter or wireless transceiver 120, data cable 138 and computer network 130. The vehicle-to-vehicle and traffic signal-to-vehicle communication system disclosed herein pertains to a method of coordinating either driver-operated or autonomous vehicles with respect to direction, speed, acceleration, etc. In some embodiments, a braking system 212, an accelerator control unit 210, and a steering control unit 206 are at least one of enabled, disabled, and variably controlled by a vehicle control unit. In some embodiments, at least one of a braking system 212, an accelerator control 210, and a steering control 206, engine control 208 are at least one of enabled, disabled, and variably controlled by a vehicle control unit. The control unit 204 receives speed information from the speedometer 214, vehicle pairing system 216, GPS™ (Global Positioning System) Navigation unit 202, transceivers 114 and 140 and transmits information to the vehicle display unit 136.

The disclosure herein pertains to a wireless communication protocol that is capable of providing vehicle-to-vehicle and/or traffic signal-to-vehicle exchange of data and/or messages. Vehicle-to-vehicle communication allows vehicles to exchange information such as speed, direction, braking and acceleration to navigate roadways more safely, even when visibility is limited.

Referring to the drawings, FIG. 1 illustrates a plurality of vehicles 104, 106 and 108 comprising a rear wireless transceiver 114, a front wireless transceiver 140, front and rear visual indicators 102 and 148, front camera 112, a rear camera 110, side cameras 146 and display unit 136. FIG. 1 further depicts a traffic light 126 transmitting and/or receiving messages and information 142 and traffic signal 122 transmitting and/or receiving messages and information 142 to/from vehicles 104, 106 and 108. FIG. 1 illustrates messages and information 132 being transmitted and/or received by vehicles 104 and 106, messages and information 144 being transmitted and/or received by vehicles 104 and 108 and messages and information 134 being transmitted and/or received by vehicles 106 and 108. However, FIG. 1 is an example of the communication protocol and is not intended to limit the disclosure. For example, messages and information 134 being transmitted and/or received by vehicle 104 and vehicles 106 and 108 or any combination thereof and including additional vehicles.

In some embodiments, the vehicle-to-vehicle and traffic signal-to-vehicle communication system further comprises a first vehicle, wherein a current speed of the first vehicle is adjusted based upon at least one message received from a traffic signal.

In some embodiments, the vehicle-to-vehicle and traffic signal-to-vehicle communication system further comprises a first vehicle, wherein a current speed of the first vehicle is adjusted based upon at least one message received from a traffic signal, and wherein the first vehicle transmits at least one message to at least one other vehicle.

In some embodiments, the vehicle-to-vehicle and traffic signal-to-vehicle communication system further comprises a current speed of the first vehicle that is adjusted based upon at least one message received from a traffic signal, wherein the first vehicle transmits at least one message to at least one other vehicle, and wherein a current speed of at least one other vehicle is adjusted based upon the at least one message received from the first vehicle.

In some embodiments, the vehicle-to-vehicle and traffic signal-to-vehicle communication system further comprises a current speed of the first vehicle that is adjusted, wherein the first vehicle transmits at least one message to a second vehicle, wherein the second vehicle transmits at least one message to a third vehicle, wherein the at least one message is propagated to each vehicle in range of each transmission and wherein a current speed of each vehicle is adjusted based upon the at least one message received from a vehicle.

Vehicle-to-traffic signal communication allows an exchange of information between traffic signals and vehicles, allowing a smoother and safer flow of traffic. Messages transmitted between vehicles are evaluated when received to determine if they are relevant to the driver and/or vehicle receiving the message. Messages of the disclosure herein comprise information on the direction of travel, speed, acceleration, etc. of the vehicle transmitting the message, and vehicles receiving the message(s) use this direction information to determine if action is necessary such as braking, accelerating, turning, etc. The messages are intended to be used in conjunction with other information available to the vehicle (e.g., visual information from the roadway or vehicle instrumentation) to allow the driver and/or vehicle to react in the most suitable way to avoid a collision, traffic jam or otherwise.

Wireless messages are sent directionally from vehicles, to reduce overall communication traffic. Therefore, communication transceivers are located on the front and rear of vehicles. Incoming messages are relayed using programming logic and may be transmitted from the front and/or rear to allow timely propagation of messages to other vehicles in range. Moreover, the strength of the transmitted message is based on the speed of the vehicle transmitting the message. For example, if a vehicle moving at a fast rate of speed applies its brakes, it will send out a stronger message than a slower moving vehicle. This protocol allows for vehicles at a greater distance to receive messages from faster moving vehicles to improve safety and awareness to other drivers.

In some embodiments, messages transmitted and received include a code for the street direction of travel that is related to the vehicle's GPS™ information. Therefore, vehicles receiving messages can determine if a message is relevant to them and disregard messages that are not required due to vehicles that are not relevant due to their direction of travel. In some embodiments, the vehicle-to-vehicle and traffic signal-to-vehicle communication system further comprises a processor unit that is configured to transmit the information to the display unit via a control unit. In some embodiments, the vehicle-to-vehicle and traffic signal-to-vehicle communication system further comprises a memory unit comprising a map database stored thereon, and wherein a processor unit is configured to generate a visual map on the display unit, wherein the map indicates the location and direction of the vehicle.

In another aspect, disclosed herein is a method of improving traffic flow and safety between vehicles, comprising a wireless vehicle-to-vehicle and traffic signal-to-vehicle communication system, comprising: a) transmitting at least one message from at least one traffic signal from a wireless transceiver to at least one vehicle; b) receiving at least one message from at least one traffic signal to at least one vehicle comprising a wireless transceiver capable of transmitting and receiving at least one message to/from at least one traffic signal; and/or transmitting and/or receiving at least one message between at least one vehicle comprising a wireless transceiver capable of transmitting and receiving at least one message to/from a plurality of vehicles, wherein information is transmitted and received via a vehicle communication system between at least two vehicles and/or at least one vehicle and at least one traffic signal, and wherein at least one of a braking system, an accelerator control unit, and a steering control unit are at least one of enabled, disabled, and variably controlled by a vehicle control unit.

In some embodiments, the method of improving traffic flow and safety between vehicles further comprises a first vehicle, wherein a current speed of the first vehicle is adjusted based upon at least one message received from a traffic signal, wherein the first vehicle transmits at least one message to at least one other vehicle, and wherein a current speed of the at least one other vehicle is adjusted based upon at least one message received from the first vehicle.

In some embodiments, the method of improving traffic flow and safety between vehicles further comprises a first vehicle, wherein a current speed of the first vehicle is adjusted, wherein the first vehicle transmits at least one message to a second vehicle, wherein the second vehicle transmits at least one message to a third vehicle, wherein the at least one message is propagated to each vehicle in range of each transmission and wherein a current speed of each vehicle is adjusted based upon the at least one message received from a vehicle.

Traffic signals include roadside speed limit signs, traffic lights at intersections, street lights, etc. and can communicate to vehicles within wireless range. The various types of communications between vehicle and traffic signals are the current state of a traffic light (e.g., red for north-south, green for east-west), the time until the next signal change (e.g., 10 seconds) and the next signal state (e.g., advanced left turn for vehicles travelling north). This transmission of information allows for autonomous vehicles in range to adjust their timing to reach the intersection. For example, if vehicles that are in range receive a message indicating the time to the next signal change, then the vehicle's drivers or autonomous vehicles can adjust their speed so that they reach the intersection as the signal changes, reducing the need to stop and improving the efficiency of traffic flow and safety between vehicles.

Vehicles can also transmit messages to traffic lights to communicate their intended direction of travel. Therefore, this protocol will allow the traffic light to coordinate its signal pattern to match the needs of the vehicles in the vicinity transmitting messages to the traffic light. For example, a vehicle can communicate to the traffic signal that it intends to turn left. The signal can then adjust its light signal pattern to accommodate the request to turn left. In another embodiment, an emergency vehicle can transmit a message to at least one traffic light to request green traffic signals in the direction of travel. The traffic signal responds to these requests and adjusts the signal pattern to accommodate the emergency vehicle. In some embodiments, the at least one traffic signal further comprises a wireless transceiver capable of receiving and transmitting at least one message from/to at least one vehicle. In some embodiments, the at least one traffic signal further comprises a wireless receiver capable of receiving at least one message from at least one vehicle. In some embodiments, the at least one traffic signal further comprises a wireless transmitter capable of transmitting at least one message from at least one vehicle.

In some embodiments, a vehicle is equipped with a short-range communication system, (e.g., Bluetooth®, Wi-Fi™, or other suitable wireless communication means) which communicates information with other nearby vehicles, which may include, but is not limited to, position (e.g., GPS™), speed, direction, and/or status such as braking being applied, measured slippage, acceleration, deceleration, direction of travel, etc.

Information regarding a nearby vehicle such as a brake light, a turn light, speed, distance, direction, etc., may be transmitted from one vehicle to a nearby or to an adjacent other vehicle. The received information is used in any appropriate manner, such as causing the receiving vehicle to change its speed or brake, to turn to avoid a collision, etc.

Messages sent from vehicles have a priority status that determines how frequently they are communicated. Some types of information that have a lower priority, such as speed and direction may be communicated periodically, (e.g., every 1 second, every ½ second, etc.) once the vehicle begins operation. Other types of information are given a higher priority and are communicated when a change in state in the vehicle occurs. Examples of change of state include but are not limited to the brake being applied, turn signal activation, traffic signal message, etc. The information is transmitted to adjacent vehicles and/or traffic signals within range of the transmitting vehicle.

Generally speaking, the longer the wireless range of the transmitting devices, the faster relative speeds between vehicles (or between a vehicle and an object) may be accommodated. For instance, with a 10-30 meter range, communications between vehicles traveling in a common direction along a common road and nearby stationary transceivers may be the most practical. However, using wireless transceivers in the vehicles with larger range communications, e.g., ½ kilometer, communications between passing vehicles is more practical as well as with stationary transceivers.

Figure 4:
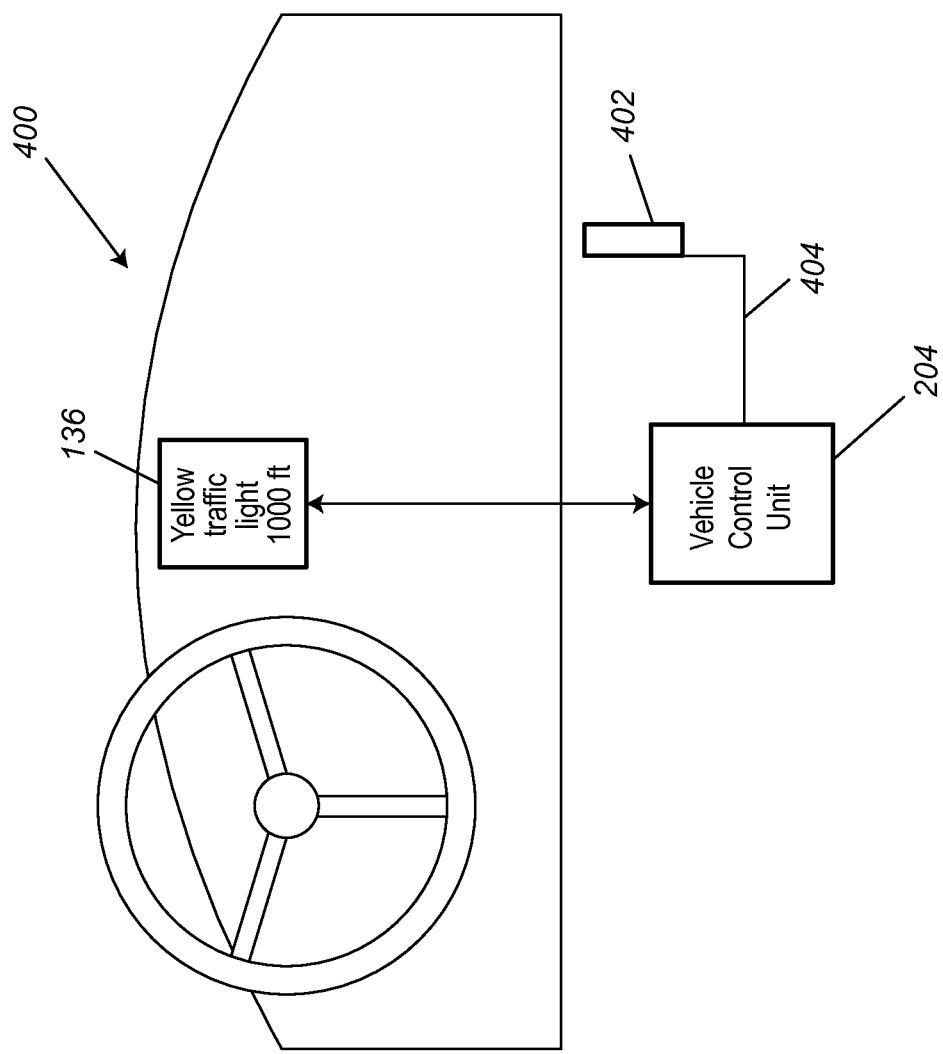
FIG. 4 is a perspective view of a communication system 400 comprising a vehicle display unit 136, a vehicle control unit 204 and a vehicle transceiver 402.

Referring to the drawings, FIG. 4 illustrates that the display unit 136 may be graphical and/or textual in nature, but in any event desirably conveys (but is not essential to convey) message information received from an adjacent vehicle or traffic signal. As shown in FIG. 4, the display unit 136 includes a graphical representation of a message received from a traffic light, wherein the vehicle control unit transmits and receives information to and from the display unit 136 and at least one wireless transceiver 402 via a data cable 404 which may also be a wireless connection.

Thus, as an example, if the driven vehicle receives a message from a first vehicle indicating that it is intending to turn left together with a closing distance and common direction, the display unit can indicate the same to the driver (either by visual display on a panel, on a heads-up display projected onto the windshield, by audible warning, etc.). Thus, the driver would be informed of a passing vehicle without having seen the vehicle(s) themselves, either in the mirror or through a window. For example, the transmitting vehicle's speed, direction, acceleration, blinker status, braking status, etc., may additionally or alternatively be transmitted by the transmitting vehicle using a Bluetooth® RF transceiver, Wi-Fi™ transceiver or other suitable means to transmit and receive short range data from each vehicle, and displayed for the drivers of the in-range vehicles.

Vehicle-to-Vehicle Messages

Speed messages: Each vehicle sends out regular messages on their speed and direction. These messages allow all vehicles travelling in the same direction to maintain optimal speed and spacing.

Rapid acceleration or rapid deceleration: When vehicles rapidly slow down, they send out a message to other vehicles. The message includes an indication that slowing is occurring and the direction of travel. Vehicles that receive the message react accordingly. Vehicles that receive the message also re-transmit the message allowing other vehicles at a greater distance to also react. The wireless message is intended to augment visual cues of an issue and to reduce the likelihood of multi-vehicle collisions.

Emergency vehicle message: Emergency vehicles (ambulance, fire truck, police vehicle, etc.) transmit wireless messages when they are moving to an emergency (i.e., when their siren is activated). When vehicles receive these messages, they may react by moving to the side of the road in a timely manner with the message received.

Vehicle turning: When a vehicle is turning left, the vehicle transmits both a message indicating its direction and its intent to turn, and also monitors vehicles travelling in the opposite direction to determine their speed. By monitoring the speed of vehicles travelling in the other direction, the vehicle gets a full view of the speed of vehicles, which might be otherwise blocked visually. Also, by sending the signal that it is turning left, oncoming vehicles may slow down slightly to allow the vehicle time to turn, thus improving efficiency of traffic flow.

Vehicle backing-up: Vehicles backing-up transmit a message that it is moving in reverse, thereby increasing communication to other vehicles while not merely relying on visual verification.

Traffic Signal-to-Vehicle Messages

Temporary speed reduction areas (i.e., construction zones): Transmitters and/or transceivers in construction zones send out wireless signals to vehicles informing the vehicles of the speed limit in the construction zone. Vehicles are allowed time to react to the received message by matching their speed to the temporary limit. Similarly, an additional transmitter and/or transceiver at the end of the construction zone can inform vehicles that the regular speed limit resumes. These transmitters and/or transceivers may replace existing temporary speed limit signs in construction zones.

Traffic light state: Traffic lights send out messages on their current state (i.e., red north-south). Each traffic light has a unique identifier. When a vehicle receives a message from a traffic light, it interprets the message and correlates this with its position to determine if the message applies to it or whether it can be disregarded.

Traffic light time-to-change and next state of the traffic light: Traffic signals can communicate their time until they change state (i.e., time remaining in seconds) and the next state. When sending out the time-to-change message, the traffic signal includes a unique identifier. When a vehicle receives a message from a traffic signal, it interprets the message and correlates it with its position to determine if the message applies to it. When the vehicle receives a message that is relevant, the vehicle adjusts its speed so that it arrives at the signal just as it changes to be "green" in the vehicle's direction of travel. To do this, the vehicle calculates its arrival at the signal using its current speed and compares this to the current signal state, the next signal state and the time to change. This avoids acceleration/deceleration of the vehicle, thus making traffic movement more efficient.

Vehicle signal needed: Vehicles can communicate the signal that they need (i.e., left or right turn) and the traffic light can accommodate this request, based on the overall traffic conditions. Vehicles only send this communication to the traffic light after they have received a message from the signal on the signal's state (i.e., when vehicles are within wireless communication range of the traffic light). In some embodiments, the message is displayed in text or graphic format on the display unit with/without audio messages to the driver of the vehicle.

Vehicle-to-Vehicle Pairing

Pairing between vehicles is accomplished by a combination of wireless and visual signals. For example, when two vehicles pair, the first vehicle must receive wireless communication from the second vehicle that identifies the vehicle. As well, the first vehicle must use a camera sensor to read an identifying mark from the first vehicle. This mark might be a combination of letters and numbers (i.e., a license plate or serial number), or a serial number presented in an encoded format, such as a QR code (Quick Response code), which is a type of matrix barcode or two-dimensional barcode. As depicted with FIG. 3, the communication system 300 illustrates vehicle indicators 102 and 148 as QR codes.

An initial implementation would use the vehicle's license plate as the identifying feature, while future implementations may use a different identifying feature, as described above. As well, future implementations may use a camera mounted on the side of the vehicle, and the identifying feature on the side of vehicles to allow pairing with vehicles to its side.

Vehicles may be paired with several other vehicles simultaneously. For example, a vehicle paired with one vehicle in front, one vehicle behind and one on either side, etc. Pairing will occur and be updated regularly (i.e., multiple times per second) to ensure that vehicle pairing is constantly updated, and takes into account changes in pairing brought upon by additional vehicles that have moved into range or vehicles that have moved out of range (i.e., when a vehicle changes lanes it is paired at the next update with the vehicles that are now ahead and behind it).

Once paired, vehicles can exchange messages on their speed, intention to change lanes or exit the roadway, acceleration, etc. Exchanging acceleration information between paired vehicles addresses problems that exist with the current method of exchanging acceleration, deceleration or negative acceleration information with brake lights. First, using brake lights to indicate that a vehicle is decelerating is a slower communication method than using paired wireless communication that notifies the following vehicle of the deceleration. The speed of this wireless communication is particularly important when vehicles are travelling at highway speeds during periods of high traffic volume or on congested roadways. Furthermore, the pairing of vehicles affords braking information that is rapidly passed on to many following vehicles in series that are paired. Therefore, rather than each vehicle individually lighting their brake lights and each vehicle behind attempting to brake based upon the visual identification of viewable brake lights from vehicle(s) being followed, the trailing vehicle is notified wirelessly of the braking vehicle without the relying on just the visual brake light warning from other vehicles. The message received by the trailing vehicle(s) that one or more vehicles ahead are braking is an improvement over drivers braking only after brake lights are observed, as it saves valuable seconds in the transfer of information and allows each vehicle to have the required time needed to brake and slow their vehicle safely. Moreover, as the brake light visual is observed down the line of vehicles, cumulative delays occur with each driver's delay in responding to brake lights, which often leads to multi-vehicle collisions on highways, particularly when visibility is reduced. Therefore, with many vehicles paired and travelling in a line, they can relay information up and down the line wirelessly without the delays caused by transferring information to multiple cars using only brake lights. By using this method, messages can be passed very quickly to several following vehicles. For example, braking information from the lead vehicle is relayed to all following vehicles, allowing very fast communication of information to all potentially affected vehicles, particularly when compared with relaying brake light information to many following vehicles.

This method of pairing and wireless communication solves the problem that brake lights present by not giving any indication of the rate of deceleration, since the same brake light intensity is not altered by the amount of brake pressure applied. The wireless communication protocol will include information on the amount of braking that is occurring, with priority messages designated for heavy braking, emergency vehicles, accidents, etc. As such, employing this pairing and communication protocol will enable much more information to be shared between paired vehicles at high data exchange rates, thereby resulting in improved traffic flow, fewer accidents and/or safer driving conditions between paired vehicles.

The pairing and communication method is ideally suited for autonomous or driverless vehicles, but applications also exist in driver-operated vehicles. For example, in a driver-operated vehicle that is paired with other vehicles, the driver may perform all operations except that the vehicle may automatically apply braking if a high priority message is received that a vehicle(s) in front is(are) braking heavily. This would be a "driver assist" feature to help operators in particularly dangerous situations. By doing this, the driver maintains more control of the vehicle, but the vehicle helps in a way that eliminates delays with anticipating braking, which would result from the driver only receiving information from the brake lights of the vehicle ahead.

In some embodiments, the pairing system further comprises at least one camera located at the front and rear of each vehicle. In some embodiments, the pairing system further comprises at least one camera located at the driver's side and/or passenger side of the vehicle. In some embodiments, the pairing system further comprises at least one camera located at the front and rear of each vehicle and/or at least one camera located at the driver's side and/or passenger side of the vehicle.

In some embodiments, the pairing system further comprises at least one matrix barcode or two-dimensional barcode located at a driver's side and/or passenger side of each vehicle.

In some embodiments, the pairing system further comprises at least one matrix barcode or two-dimensional barcode located at a front and rear of each vehicle.

In some embodiments, the pairing system further comprises a) at least one camera located at a front and rear of each vehicle and/or at least one camera located at a driver's side and/or a passenger side of each vehicle; and b) at least one matrix barcode or at least one two-dimensional barcode located at a front and rear of each vehicle and/or at least one matrix barcode or at least one two-dimensional barcode located at a driver's side and/or a passenger side of each vehicle, wherein the pairing system is capable of recognizing a vehicle license plate number, one or more matrix barcodes and/or one or more two-dimensional barcodes via one or more cameras.

In some embodiments, the pairing system further comprises a) at least one camera located at a front and rear of each vehicle and/or at least one camera located at a driver's side and/or a passenger side of each vehicle; and b) at least one matrix barcode or at least one two-dimensional barcode located at a front and rear of each vehicle and/or at least one matrix barcode or at least one two-dimensional barcode located at a driver's side and/or a passenger side of each vehicle, wherein the pairing system is capable of recognizing a vehicle's license plate number, one or more matrix barcodes and/or one or more two-dimensional barcodes via one or more cameras, and wherein the pairing system is capable of transmitting a vehicle's license plate number, a matrix barcode and/or a two-dimensional barcode to at least one vehicle.

In some embodiments, the method of improving traffic flow and safety between vehicles further comprises a pairing system comprising a) at least one camera located at a front and rear of each vehicle and/or at least one camera located at a driver's side and/or a passenger side of each vehicle; and b) at least one matrix barcode or two-dimensional barcode located at a front and rear of each vehicle and/or at least one matrix barcode or at least one two-dimensional barcode located at a driver's side and/or a passenger side of each vehicle, wherein the pairing system is capable of recognizing a vehicle license plate number, one or more matrix barcodes and/or one or more two-dimensional barcodes via one or more cameras.

In some embodiments, the method of improving traffic flow and safety between vehicles claim 15, further comprises a pairing system comprising a) at least one camera located at a front and rear of each vehicle and/or at least one camera located at a driver's side and/or a passenger side of each vehicle; and b) at least one matrix barcode or two-dimensional barcode located at a front and rear of each vehicle and/or at least one matrix barcode or at least one two-dimensional barcode located at a driver's side and/or a passenger side of each vehicle, wherein the pairing system is capable of recognizing a vehicle's license plate number, one or more matrix barcodes and/or one or more two-dimensional barcodes via one or more cameras, and wherein the pairing system is capable of transmitting a vehicle's license plate number, a matrix barcode and/or a two-dimensional barcode to at least one vehicle.

Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.).

Such circuitry may be adapted to perform functions and/or features that may be associated with various software elements described throughout.

Figure 5:
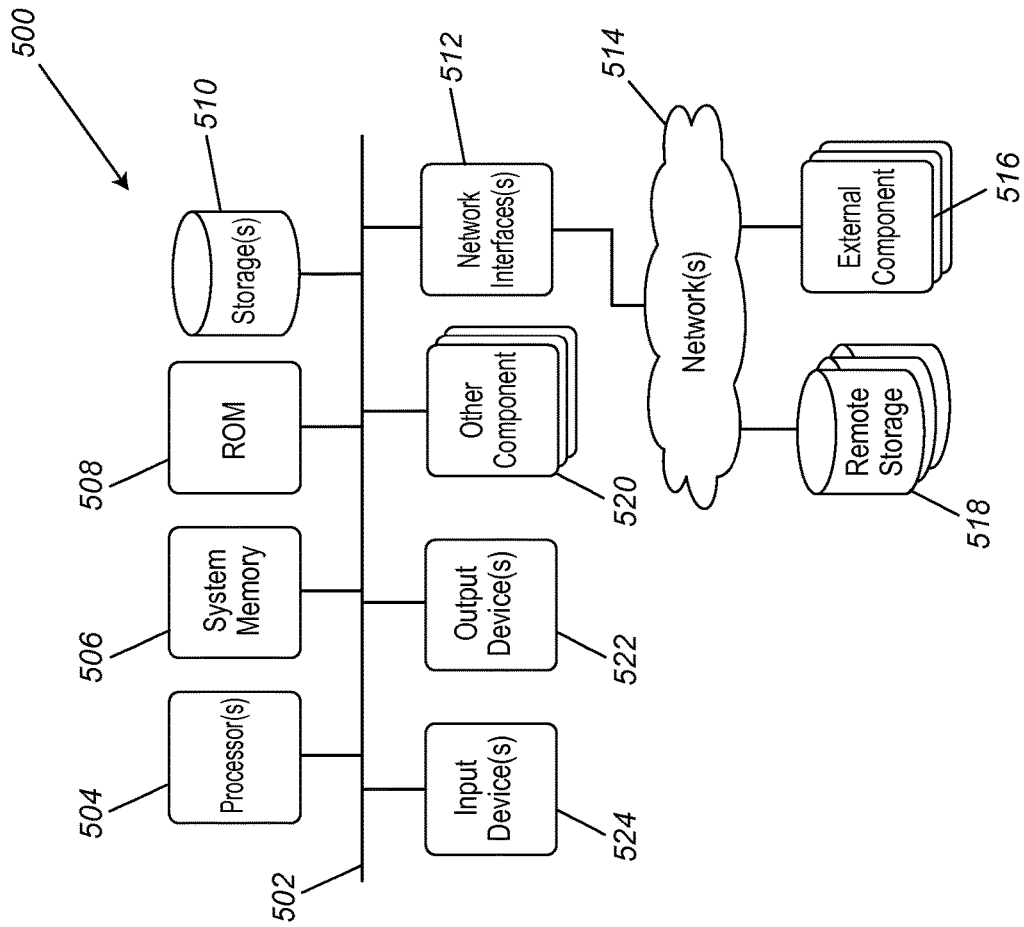
FIG. 5 illustrates a schematic block diagram of a conceptual computer system 500 used to implement some embodiments. For example, the system described above in reference to FIGS. 1 and 2 may be at least partially implemented using computer system 500.

Referring to the drawings, FIG. 5 illustrates a schematic block diagram of a conceptual computer system 500 used to implement some embodiments. For example, the system described above in reference to FIGS. 1-4 may be at least partially implemented using all or a portion of computer system 500.

Computer system 500 may be implemented using various appropriate devices. For instance, the computer system may be implemented using one or more vehicle display units, personal computers (PCs), servers, mobile devices (e.g., a smartphone), tablet devices, and/or any other appropriate devices. The various devices may work alone (e.g., the computer system may be implemented as a vehicle display unit) or in conjunction (e.g., some components of the computer system may be provided by a vehicle display unit while other components may be provided by a tablet device).

As shown, computer system 500 may include at least one communication bus 502, one or more processors 504, a system memory 506, a read-only memory (ROM) 508, permanent storage devices 510, input devices 524, output devices 522, various other components 520 (e.g., a graphics processing unit), and one or more network interfaces 512 and may include a network 514, corresponding remote storage 518 and a corresponding external component 516.

Bus represents all communication pathways among the elements of computer system 500. Such pathways may include wired, wireless, optical, and/or other appropriate communication pathways. For example, input devices 524 and/or output devices 522 may be coupled to the system 500 using a wireless connection protocol or system.

The processor 504 may, in order to execute the processes of some embodiments, retrieve instructions to execute and/or data to process from components such as system memory 506, ROM 508, and permanent storage device 510. Such instructions and data may be passed over bus 502.

System memory 506 may be a volatile read-and-write memory, such as a random access memory (RAM). The system memory may store some of the instructions and data that the processor uses at runtime. The sets of instructions and/or data used to implement some embodiments may be stored in the system memory 506, the permanent storage device 510, and/or the read-only memory 508. ROM 508 may store static data and instructions that may be used by processor 504 and/or other elements of the computer system.

Permanent storage device 510 may be a read-and-write memory device. The permanent storage device may be a non-volatile memory unit that stores instructions and data even when computer system 500 is off or unpowered. Computer system 500 may use a removable storage device and/or a remote storage device as the permanent storage device.

Input devices 524 may enable a user to communicate information to the computer system and/or manipulate various operations of the system. The input devices may include keyboards, cursor control devices, audio input devices and/or video input devices. Output devices 522 may include printers, displays, and/or audio devices. Some or all of the input and/or output devices may be wirelessly or optically connected to the computer system.

Other components 520 may perform various other functions. These functions may include performing specific functions (e.g., graphics processing, sound processing, etc.), providing storage, interfacing with external systems or components, etc.

Referring to FIG. 5, computer system 500 may be coupled to one or more networks 514 through one or more network interfaces 512. For example, computer system 500 may be coupled to a web server on the Internet such that a web browser executing on computer system 500 may interact with the web server as a user interacts with an interface that operates in the web browser. Computer system 500 may be able to access one or more remote storages 518 and one or more external components 516 through the network interface 512 and network 514. The network interface(s) 512 may include one or more application programming interfaces (APIs) that may allow the computer system 500 to access remote systems and/or storages and also may allow remote systems and/or storages to access computer system 500 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 500 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The presently disclosed wireless vehicle-to-vehicle and traffic signal-to-vehicle communication system is not to be limited in scope by the specific embodiments described herein, which are intended as single illustrations of individual aspects of the presently disclosed devices and methods, and functionally equivalent devices, methods and components are within the scope of the presently disclosed wireless vehicle to vehicle and traffic signal to vehicle communication system. Indeed, various modifications of the presently disclosed wireless vehicle-to-vehicle and traffic signal-to-vehicle communication system, in addition to those shown and described herein will become apparent to those skilled in the art from the foregoing description and accompanying drawings. Such modifications are intended to fall within the scope of the appended claims.

What is claimed is:

1. A wireless vehicle-to-vehicle and traffic signal-to-vehicle communication system, comprising:
   a) at least one traffic signal comprising a wireless transceiver capable of transmitting and receiving at least one message to/from at least one vehicle; and
   b) at least two vehicles, each comprising a vehicle communication unit comprising
      i. at least one vehicle wireless transceiver capable of transmitting and receiving at least one message to/from a plurality of vehicles and/or traffic signals;
      ii. a vehicle display unit; and
      iii. a vehicle-to-vehicle pairing system comprising:
         one or more wireless messages, visual indicators or a combination thereof, at least one camera located at a front and rear of each vehicle and/or at least one camera located at a driver's side and/or a passenger side of each vehicle; and at least one unique identifying mark located at a front and rear of each vehicle and/or at a driver's side and/or a passenger side of each vehicle, wherein the pairing system is capable of recognizing the unique identifying mark via one or more cameras, wherein the communication system is configured for wireless communication, and wherein information is transmitted and received via the communication system between the at least two vehicles and/or at least one vehicle and at least one traffic signal.

2. The vehicle-to-vehicle and traffic signal-to-vehicle communication system of claim 1, wherein the vehicle communication unit further comprises a processor unit configured to store data in a system memory received from the pairing system, at least one message from at least one vehicle, at least one message from at least one traffic signal or a combination thereof.

3. The vehicle-to-vehicle and traffic signal-to-vehicle communication system of claim 1, wherein a braking system, an accelerator control unit and a steering control unit are at least one of enabled, disabled, and variably controlled by a vehicle control unit.

4. The vehicle-to-vehicle and traffic signal-to-vehicle communication system of claim 1, wherein the pairing system further comprises at least one camera located at a front and rear of each vehicle and/or at least one camera located at a driver's side and/or a passenger side of each vehicle.

5. The vehicle-to-vehicle and traffic signal-to-vehicle communication system of claim 1, wherein the pairing system further comprises at least one matrix barcode or at least one two-dimensional barcode located at a front and rear of each vehicle and/or at least one matrix barcode or at least one two-dimensional barcode located at a driver's side and/or a passenger side of each vehicle.

6. The vehicle-to-vehicle and traffic signal-to-vehicle communication system of claim 1, wherein the pairing system further comprises
a) at least one camera located at a front and rear of each vehicle and/or at least one camera located at a driver's side and/or a passenger side of each vehicle; and
b) at least one matrix barcode or at least one two-dimensional barcode located at a front and rear of each vehicle and/or at least one matrix barcode or at least one two-dimensional barcode located at a driver's side and/or a passenger side of each vehicle, wherein the pairing system is capable of recognizing a vehicle's license plate number, one or more matrix barcodes and/or one or more two-dimensional barcodes via one or more cameras, and wherein the pairing system is capable of transmitting a vehicle's license plate number, a matrix barcode and/or a two-dimensional barcode to at least one vehicle.

7. The vehicle-to-vehicle and traffic signal-to-vehicle communication system of claim 1, further comprising a first vehicle, wherein a current speed of the first vehicle is adjusted based upon the at least one message received from a traffic signal.

8. The vehicle-to-vehicle and traffic signal-to-vehicle communication system of claim 1, further comprising a first vehicle, wherein a current speed of the first vehicle is adjusted based upon the at least one message received from a traffic signal, and wherein the first vehicle transmits the at least one message to at least one other vehicle.

9. The vehicle-to-vehicle and traffic signal-to-vehicle communication system of claim 1, further comprising a first vehicle, wherein a current speed of the first vehicle is adjusted based upon the at least one message received from a traffic signal, wherein the first vehicle transmits the at least one message to at least one other vehicle, and wherein a current speed of the at least one other vehicle is adjusted based upon the at least one message received from the first vehicle.

10. The vehicle-to-vehicle and traffic signal-to-vehicle communication system of claim 1, further comprising a first vehicle, wherein a current speed of the first vehicle is adjusted, wherein the first vehicle transmits the at least one message to a second vehicle, wherein the second vehicle transmits the at least one message to a third vehicle, wherein the at least one message is propagated to each vehicle in range of each transmission and wherein a current speed of each vehicle is adjusted based upon the at least one message received from a vehicle.

11. The vehicle-to-vehicle and traffic signal-to-vehicle communication system of claim 1, further comprising a processor unit is configured to transmit the information to the display unit via the communications unit.

12. The vehicle-to-vehicle and traffic signal-to-vehicle communication system of claim 1, further comprising a memory unit comprising a map database stored thereon, and wherein a processor unit is configured to generate a visual map on the display unit, wherein the map indicates a location and direction of the vehicle.

13. A method of improving traffic flow and safety between vehicles, comprising a wireless vehicle-to-vehicle and traffic signal-to-vehicle communication system, comprising:
a) transmitting at least one message from at least one traffic signal from a wireless transceiver to at least one vehicle;
b) receiving at least one message from at least one traffic signal to at least one vehicle comprising a wireless transceiver capable of transmitting and receiving at least one message to/from the at least one traffic signal; and/or transmitting and/or receiving at least one message between at least one vehicle comprising a wireless transceiver capable of transmitting and receiving at least one message to/from a plurality of vehicles, and
c) a pairing system comprising
at least one camera located at a front and rear of each vehicle and/or at least one camera located at a driver's side and/or a passenger side of each vehicle; and
at least one one unique identifying mark located at a front and rear of each vehicle and/or at a driver's side and/or a passenger side of each vehicle,
wherein the pairing system is capable of recognizing the one unique identifying mark via one or more cameras,
wherein information is transmitted and received via a communication system between at least two vehicles and/or at least one vehicle and at least one traffic signal,
wherein at least one of a braking system, an accelerator control unit, and a steering control unit are at least one of enabled, disabled, and variably controlled by a vehicle control unit.

14. The method of improving traffic flow and safety between vehicles claim 13, further comprising a pairing system comprising a) at least one camera located at a front and rear of each vehicle and/or at least one camera located at a driver's side and/or a passenger side of each vehicle; and
b) at least one matrix barcode or two-dimensional barcode located at a front and rear of each vehicle and/or at least one matrix barcode or at least one two-dimensional barcode located at a driver's side and/or a passenger side of each vehicle,
wherein the pairing system is capable of recognizing a vehicle's license plate number, one or more matrix barcodes and/or one or more two-dimensional barcodes via one or more cameras, and wherein the pairing system is capable of transmitting a vehicle's license plate number, a matrix barcode and/or a two-dimensional barcode to at least one vehicle.

15. The method of improving traffic flow and safety between vehicles claim 13, further comprising a first vehicle, wherein a current speed of the first vehicle is adjusted based upon the at least one message received from a traffic signal, wherein the first vehicle transmits the at least one message to at least one other vehicle, and wherein a current speed of the at least one other vehicle is adjusted based upon the at least one message received from the first vehicle.

16. The method of improving traffic flow and safety between vehicles claim 13, further comprising a first vehicle, wherein a current speed of the first vehicle is adjusted, wherein the first vehicle transmits the at least one message to a second vehicle, wherein the second vehicle transmits the at least one message to a third vehicle, wherein the at least one message is propagated to each vehicle in range of each transmission and wherein a current speed of each vehicle is adjusted based upon the at least one message received from a vehicle.

* * * * *